(12) United States Patent
Rockefeller et al.

(10) Patent No.: US 7,979,059 B2
(45) Date of Patent: Jul. 12, 2011

(54) EXCHANGE OF VOICE AND VIDEO BETWEEN TWO CELLULAR OR WIRELESS TELEPHONES

(76) Inventors: Alfred G. Rockefeller, Ramsey, NJ (US); A. Zeki Erdin, Franklin Lakes, NJ (US)

( * ) Notice: Subject to any disclaimer, the term of this patent is extended or adjusted under 35 U.S.C. 154(b) by 1238 days.

(21) Appl. No.: 11/521,416

(22) Filed: Sep. 15, 2006

(65) Prior Publication Data

US 2007/0182811 A1    Aug. 9, 2007

Related U.S. Application Data

(60) Provisional application No. 60/765,361, filed on Feb. 6, 2006.

(51) Int. Cl.
*H04W 88/02* (2009.01)
(52) U.S. Cl. ............. 455/414.1; 455/445; 455/567
(58) Field of Classification Search ............ 455/414.1, 455/567, 551, 445; 725/34
See application file for complete search history.

(56) References Cited

U.S. PATENT DOCUMENTS

| | | | | |
|---|---|---|---|---|
| 6,434,394 | B1 * | 8/2002 | Grundvig et al. | 455/463 |
| 6,879,828 | B2 * | 4/2005 | Virtanen et al. | 455/426.1 |
| 7,688,203 | B2 * | 3/2010 | Rockefeller et al. | 340/541 |
| 2003/0017855 | A1 * | 1/2003 | Ishikawa et al. | 455/564 |
| 2003/0053454 | A1 * | 3/2003 | Katsavounidis et al. | 370/389 |
| 2003/0096627 | A1 * | 5/2003 | Rasanen et al. | 455/466 |
| 2003/0208754 | A1 * | 11/2003 | Sridhar et al. | 725/34 |
| 2004/0068648 | A1 * | 4/2004 | Lewis et al. | 713/153 |
| 2004/0218035 | A1 * | 11/2004 | Crook | 348/14.02 |
| 2005/0190782 | A1 * | 9/2005 | Buckley et al. | 370/437 |
| 2005/0277421 | A1 * | 12/2005 | Ng | 455/445 |
| 2006/0165059 | A1 * | 7/2006 | Batni et al. | 370/352 |
| 2006/0165092 | A1 * | 7/2006 | Wilson et al. | 370/395.21 |
| 2006/0182245 | A1 * | 8/2006 | Steinmetz | 379/127.01 |
| 2006/0187900 | A1 * | 8/2006 | Akbar | 370/352 |
| 2006/0258340 | A1 * | 11/2006 | Eronen | 455/414.1 |
| 2006/0291455 | A1 * | 12/2006 | Katz et al. | 370/355 |
| 2007/0005795 | A1 * | 1/2007 | Gonzalez | 709/232 |
| 2007/0076608 | A1 * | 4/2007 | Samuel et al. | 370/230 |
| 2007/0126859 | A1 * | 6/2007 | Choi et al. | 348/14.02 |
| 2007/0139513 | A1 * | 6/2007 | Fang | 348/14.01 |
| 2007/0293148 | A1 * | 12/2007 | Chiang | 455/3.06 |

OTHER PUBLICATIONS

Keiji Tachikawa, A Perspective on the Evolution of Mobile Communications, IEEE Communication Magazine Oct. 2003, pp. 66, 69, and 70.*

* cited by examiner

*Primary Examiner* — Diane Mizrahi

(57) ABSTRACT

A Fourth generation (4G) Wireless videoconferencing system which employs Quality of Service (QOS) features of a fourth generation wireless network to configure bandwidth on a per call basis. Selection of a videoconferencing terminating subscriber on a video subscriber table in the originating terminal causes the call to be routed directly via the Fourth Generation network to the terminating subscriber terminal and the sending of a class of service to the terminating subscriber terminal embedded in an "alternate caller ID". The class of service tells the terminating terminal to configure terminating terminal for videoconferencing.

4 Claims, 4 Drawing Sheets

EXCHANGE OF VOICE AND VIDEO BETWEEN TWO CELLULAR OR WIRELESS TELEPHONES

CROSS REFERENCE TO RELATED APPLICATIONS

Application Number PCT/US2004/031105

OPEN TO VIEW VIDEO TELEPHONY CALL IN A WIRELESS COMMUNICATION DEVICE

International Filing Date: 22 Sep. 2004

This application identifies the concept of exchanging voice and video between two wireless terminals. It identifies the need for a full duplex transmission path, but does not identify the necessity of a particular transmission path configuration or a particular method of call set up. It does not take into account the rather severe limitations imposed by use of existing wireless voice networks for video transmission and does not offer use of new networking concepts and specifications as defined by recent network design (example IEEE 802.16, 802.20, 802.22).

United States Patent Application 0020135671

IMAGE TELECOMMUNICATION SYSTEM FOR PERSONAL DIGITAL ASSISTANT AND A CONTROL METHOD THEREOF

Filing Date: 26 Sep. 2002

This application attempts to define the modifications to a personal digital assistant to render the device capable of functioning as a videophone terminal between PDA's, a PDA and a PC and between a PDA and videophone. The application seems not to define the end to end requirements, but rather defines the means to configure the terminal to allow use as a videophone. In this sense, the application seems to be incomplete.

U.S. Pat. No. 6,469,731

PORTABLE VIDEOPHONE UNIT

Filing Date: 22 Oct. 2002

This invention defines the means of providing video continuity when the video stream is interrupted momentarily. This means results in retaining a frame when the succeeding frame is delayed by a specified period. The succeeding frame may be discarded and replaced with the next succeeding frame. This method allows repair of momentarily interrupted video frames by carrying the present frame over one or several succeeding frames. The invention thus narrowly defines a certain aspect of videophone service, but does not define the service itself.

U.S. Pat. No. 7,688,203

SURVEILLANCE DEVICE BY USE OF DIGITAL CAMERAS LINKED TO A CELLULAR OR WIRELESS TELEPHONE

Filing Date: 5 Jan. 2007

A Surveillance Device employing a fourth generation wireless network to send video and sound between two terminals.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

There are prior patent applications in which the stated objective is the definition of the means of instituting a wireless videophone service. All of these applications take for granted the existence of a suitable transmission path without identifying or defining such a path. The service as defined by these various applications is therefore lacking this essential element. Also lacking is the definition of the specific means of terminal configuration and call set up. These are typically described in vague terms.

The existing wireless communication networks are used for either cellular voice communication or downloading of broadband data, but not both. Voice and broadband applications are supported over separate networks. As yet there is no unique network which will carry both voice traffic and broadband data simultaneously. The IEEE and other entities are developing specifications for a network which may be dynamically configured to carry content of various bandwidths such as voice or broadband data. Implementation of these specifications will result in construction of a network which will carry both voice and broadband data such as streaming video. The new network specifications specifically allow such an arrangement which will include switched connections to various entities satisfying differing and diverse requirements. The new network will be defined as a fourth generation wireless network (4G) and will carry voice and broadband downloaded and uploaded data.

For example, the IEEE 802.16 series of specifications defines a broadband network using Orthogonal Frequency Division Multiple Access technology (OFDMA). This new network will be defined as a fourth generation wireless network (4G). Use of this new technology will satisfy requirements for voice, data downloading, data uploading and full duplex data exchange on one network by allowing the subscriber station to initiate configuration of the bandwidth necessary for multiple uses. The originating subscriber station will be able to contend for more bandwidth by employing a CDMA BW request (IEEE 802.16) which will be recognized by the network. The network will then configure the communication channel with the necessary bandwidth and acknowledge that fact to the subscriber station.

Deployment of the new 4G network will greatly facilitate inauguration of a new service which will allow the subscriber terminal to select the proper bandwidth to satisfy requirements for all wireless services including exchange of video and voice. This specification will deal with the process of defining this new video service based on the new wireless network specifications.

BRIEF SUMMARY OF THE INVENTION

This specification explains the requirements and method for the exchange of streaming video and voice between two wireless terminals. Since streaming video exchange is not practical using existing second generation (2G) and third generation (3G) cellular networks because of network congestion problems, Fourth Generation (4G) network technology must be employed. This technology is in the process of development via open network definition (such as IEEE 802.16). Implementation of this 4G network will supply the means of satisfying the specific desired application of the exchange of voice and video between two wireless terminals. The originating terminal will interact with the 4G network to set bandwidth requirements and also to cause the called terminal to configure itself to video mode automatically. Other applications such as video surveillance may also be implemented over the new network by the same means.

DETAILED DESCRIPTION OF THE INVENTION

The present wireless networks are configured for either cellular voice use (second and third generation wireless (2g and 3G) or for higher speed data including downloads from the Internet, video downloads and music downloads. The three latter are being achieved by use of new broadband wireless networks such as WiMAX (based on IEEE 802.16e), UMTS, EV-DO and WiBRO (in Korea). These networks are designed to facilitate downloading of high speed data to both fixed and mobile users using new broadband interfaces built into wireless terminals. Newer networks such as IEEE 802.16n, 802.20 and 802.22 are still undergoing planning and specification in IEEE working groups. Please note that the voice and broadband data functions presently are carried on separate networks which are configured for voice and text only (2G and 3G) or downloaded broadband data only.

These new, network specifications allow extensions of WI-FI (IEEE 802.11) and inclusion of both long range fixed and mobile wireless communication using new technology to achieve greater bandwidth. An example of this is OFDMA (Orthogonal Frequency Division Multiple Access) technology which will allow dynamic bandwidth allocation so that the network may carry voice, video, Internet download and high speed data. IEEE 802.16 provides the building blocks for creation of a new mobile network which will replace the existing voice and broadband wireless networks with one fourth generation (4G) network. This new network will fulfill all of the functions of the two existing network types. This new mobile technology will use existing cellular towers to allow a seamless phased cut over to the new network from existing 2G, 3G and broadband networks. The new fourth generation network will support voice, broadband data and real time streaming video exchange between wireless terminals. Dynamic bandwidth allocation inherent in the new network will allow efficient use of spectrum to support both voice and higher speed data requirements. The deployment of this new network will allow real time full duplex streaming video and voice exchange between wireless terminals. The thrust of this specification is the development of such a service.

Wireless terminals will be equipped with a digital video camera (FIG. 1, 1.3) A microphone and speaker will allow a speaker phone mode to be employed automatically upon exercising of the video option.

Video will be displayed on a color screen as presently used for interfacing Internet entities from wireless terminals. Each terminal will be equipped with video send and receive capability to exchange both voice and video.

Figure 1:
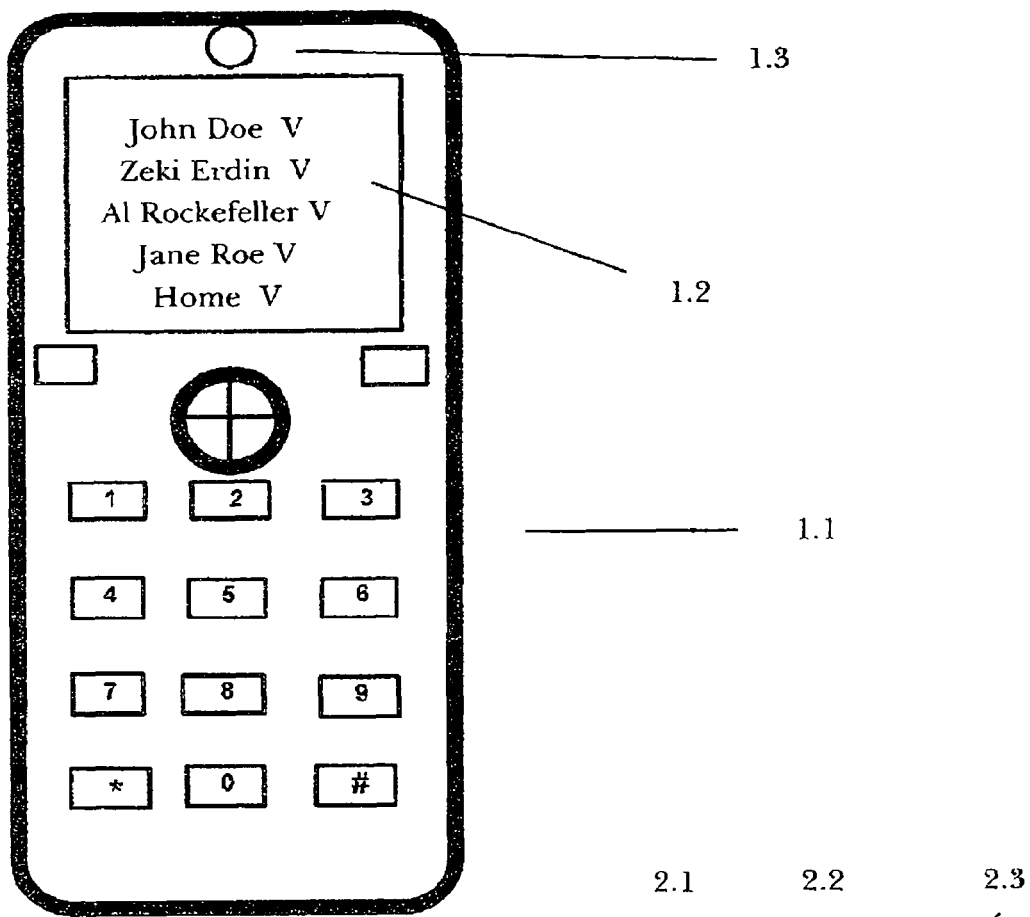
FIG. 1 represents a view of a wireless terminal showing a table of video contacts displayed on the terminal screen.
 1.1 Depiction of a wireless terminal.
 1.2 Depiction of individual video contacts displayed on terminal screen.
 1.3 Depiction of video camera lens on wireless terminal
Figure 2:
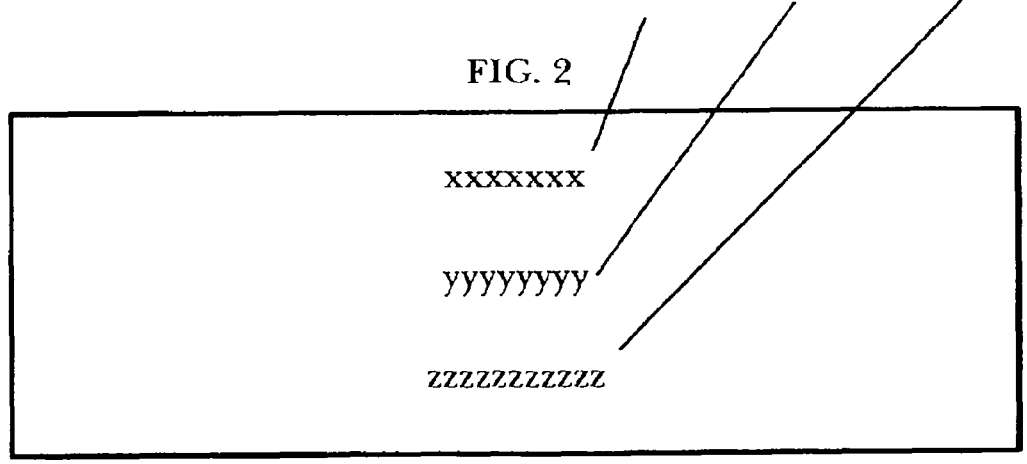
FIG. 2 shows an individual routing table matched with each entry in video contact table.
 2.1 xxxxxxx represents a CDMA-BW entry which will be output to the network to request the proper bandwidth configuration.
 2.2 yyyyyyyy represents Class of Service characters to be sent to the network to distinguish video service from other services.
 2.3 zzzzzzzzzzz represents the address of the receiving terminal.
Length of character strings are for illustrative purpose only and may not represent actual length.

Selection of the video option on the originating terminal will be table driven. Each user's wireless terminal will contain a list of his contacts who have the video option. All entities in the individual user's video calling group will be displayed on a table (FIG. 1, 1.2). Each video option table entry will be associated with a routing table which contains the selection number of the terminating subscriber (FIG. 2, 2.3), a Class of Service code (FIG. 2, 2.2) and an appropriate CDMA BW request code (IEEE 802.16) (FIG. 2, 2.1).

Exercising the table entry and pressing the "call" button (FIG. 5, 5.1) will cause the originating subscriber terminal to select the 4G network and send the CDMA BW request code.

Figure 5:
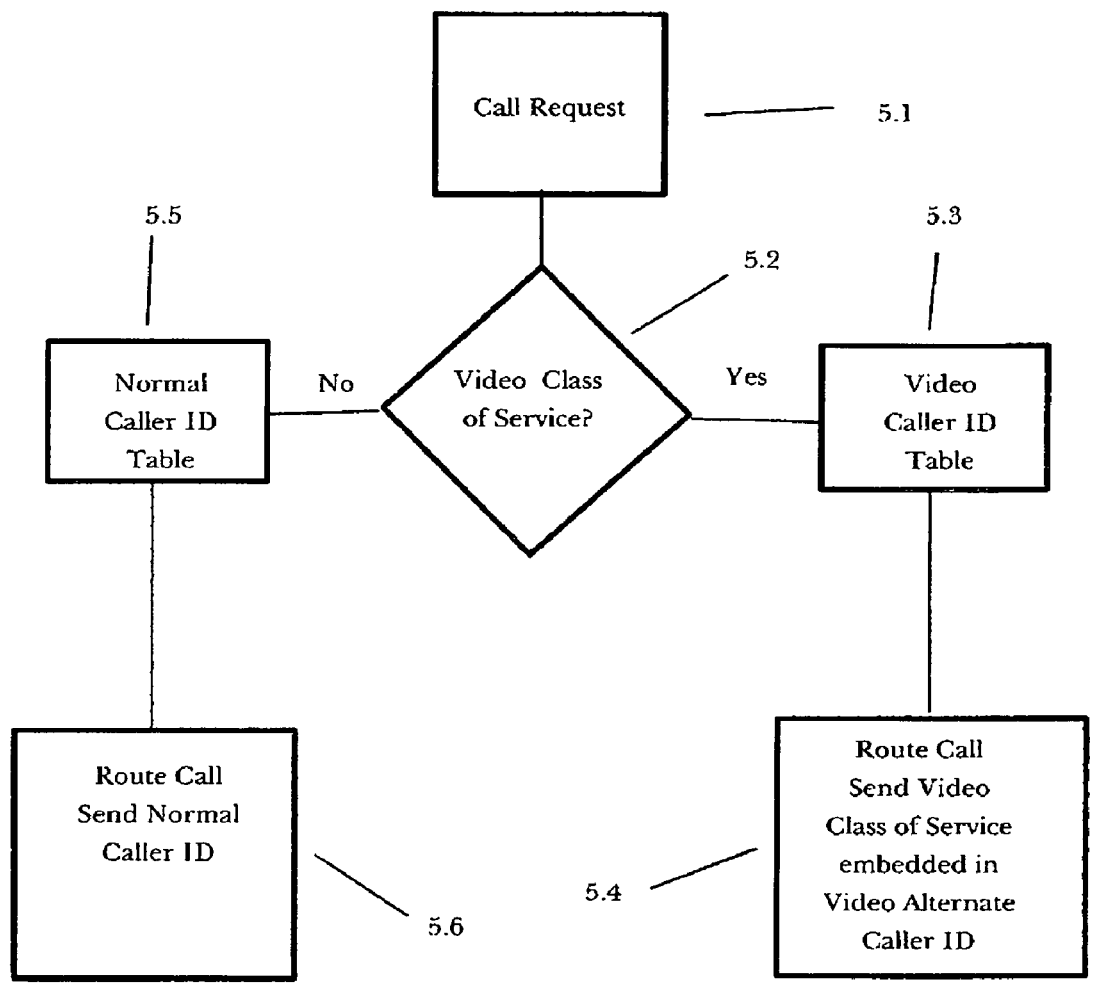
FIG. 5 depicts a flow chart in which the network decides whether to select a video Caller ID table in response to whether or not an originating terminal forwards a video class of service during call request.
 5.1 shows an originating terminal call request to the fourth generation network
 5.2 shows a logical check for video class of service
 5.3 shows interrogation of video caller ID table if 5.2 is affirmative
 5.4 shows routing of video call with video class of service embedded in alternate caller ID
 5.5 shows interrogation of normal Caller ID table if 5.2 is negative
 5.6 shows routing of normal call using normal caller ID

The CDMA BW request code will signal the network to assign the proper bandwidth. Implementation of network configuration will be acknowledged by the network. The terminal will then send selection and the Class Of Service Code. The Class Of Service will cause the network to access an alternate video "caller ID" database in which the originator is identified as a video subscriber for billing purposes (FIG. 5, 5.3). The individual video "caller ID" will contain a terminating class of service code which will be downloaded to the terminating terminal as part of the "caller ID" package after call routing FIG. 5, (5.4). Receipt of the class of service code by the terminating terminal will cause it to configure itself for video mode. Terminal logic will select a ring tone unique to video service.

Figure 3:
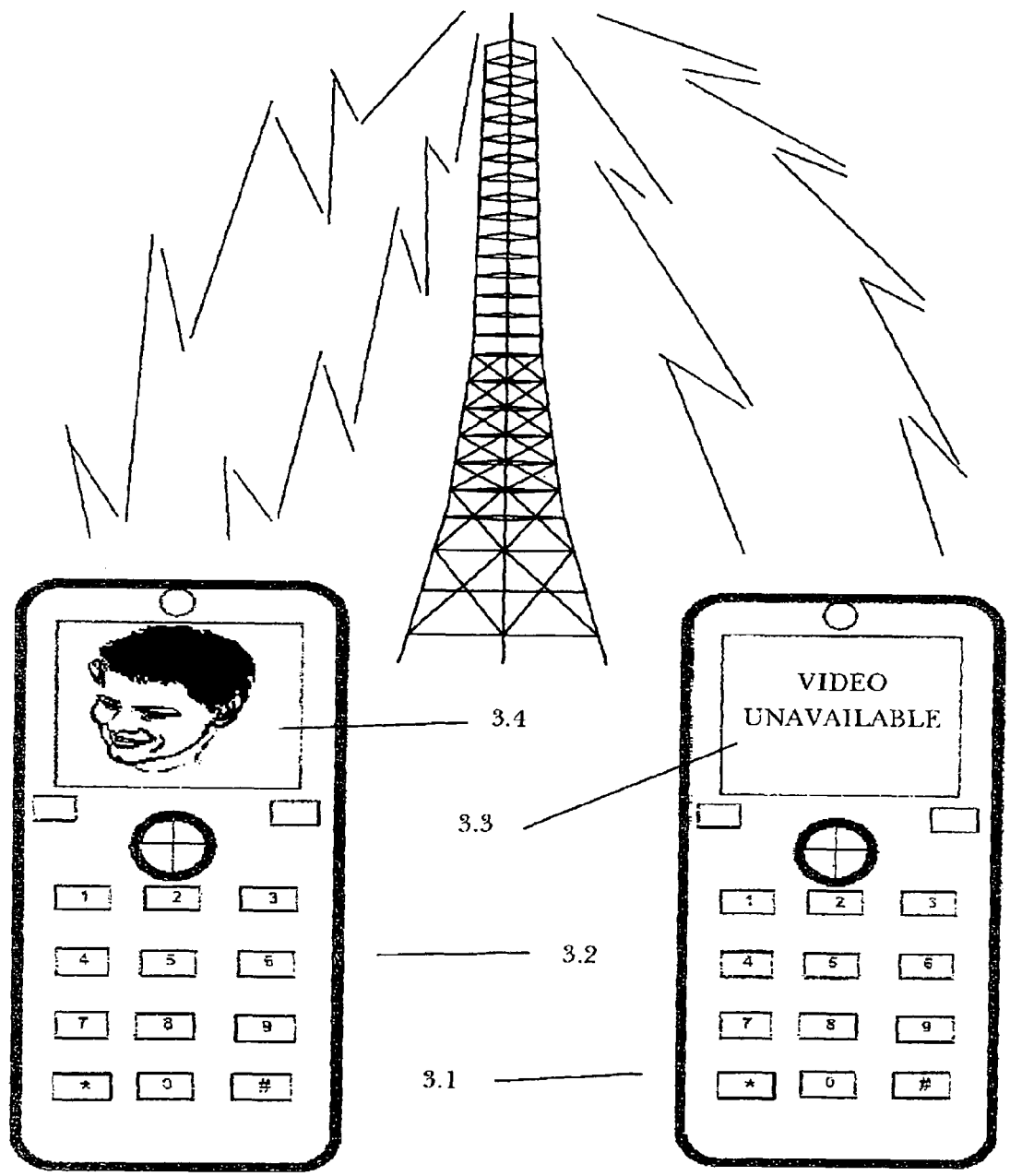
FIG. 3 represents a view of terminal to terminal connection in which the recipient opts to not send video.
 3.1 Depiction of originating terminal.
 3.2 Depiction of receiving terminal.
 3.3 Depiction of video frame option which is exercised by recipient displayed on sending terminal.
 3.4 Depiction of streaming video sent by originating terminal displayed on receiving terminal.
Figure 4:
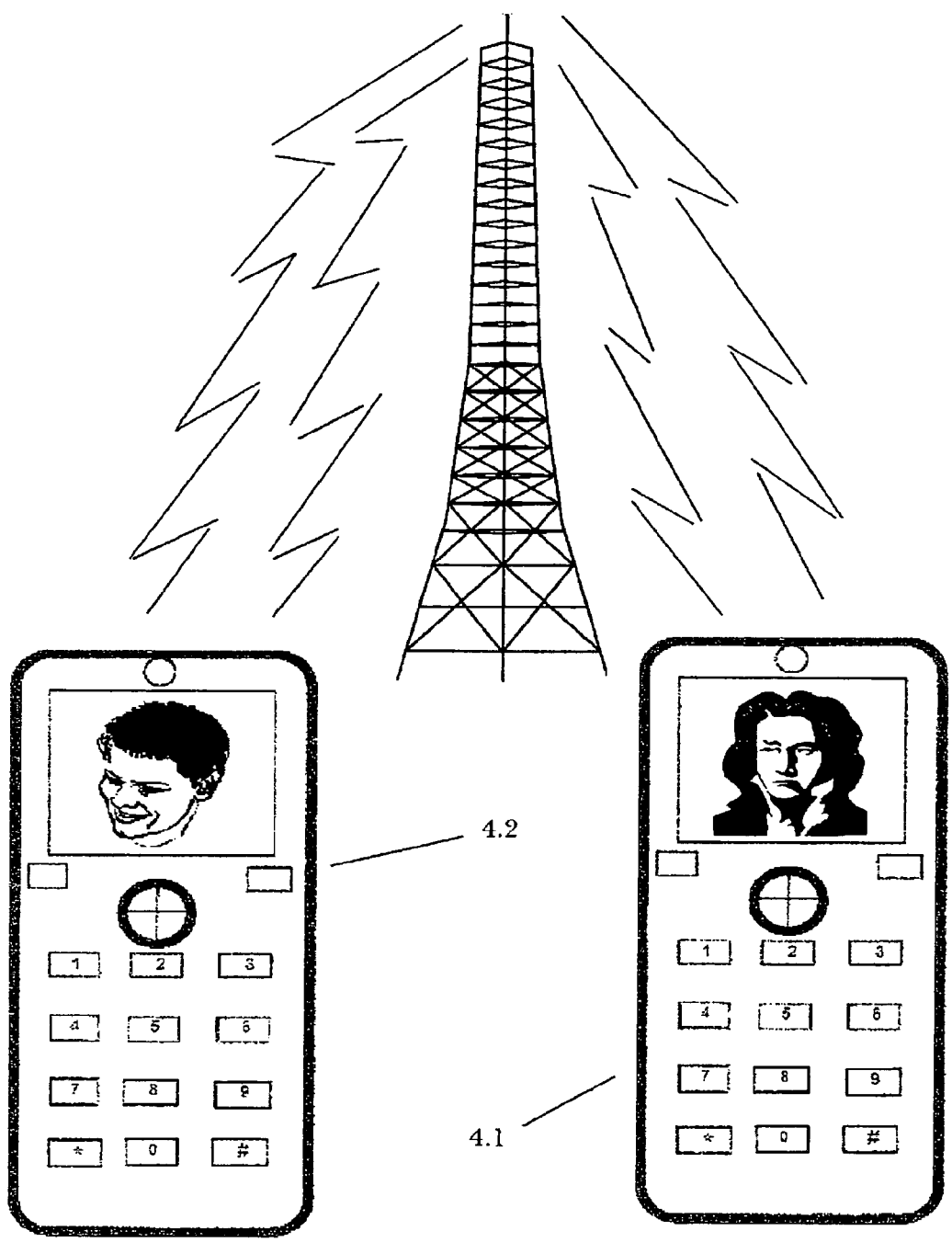
FIG. 4 depicts a video call in full connect mode.
 4.1 Depiction of originating terminal.
 4.2 Depiction of receiving terminal.

The called party will answer in the usual manner. After call connect, both originator (FIG. 4, 4.1) and receiver (FIG. 4, 4.2) will be put into video mode and speaker phone mode automatically. Video will be displayed on both forward and backward paths after call connection unless the recipient finds it inconvenient to send video, in which case he may select a voice only keyed option. This will allow the recipient to receive video from the originator. The originator will receive a "canned" video frame which will inform him that the recipient has opted out of the video send mode (FIG. 3, 3.3). The recipient may reenter the video mode via another keyed option. Video will be exchanged using an appropriate compression/decompression algorithm.

Both participating entities will frame themselves in the video camera field of view and, in turn, speak into the microphone. These actions will cause both the speech and video to be sent to the other entity. Video will be displayed on each terminal screen. Speech will be sent via each terminal speaker. The range and sensitivity of the microphone will allow exchange of speech when the video camera is oriented away from the subscriber.

Transmission will be in the full-duplex mode to allow video to be observed on both terminals simultaneously. Speech will follow the present cellular or wireless transmission rules. Ending the call will involve clearing via disconnect button on either terminal in the normal manner. Each terminal will be able to operate as a cellular or wireless terminal in all normal modes of operation when not employing the video and voice exchange option. Selection of addresses outside the special table will cause a connection in the normal cellular or wireless mode. The special table may contain entities marked with a different class of service code and CDMA BW request unique to a different type of broadband service. Voice service may be defined by a CDMA BW code as well, but may be selected by either table or selection digits.

Table generation may be done on separate facilities and down-loaded to individual cellular or wireless terminals or may be done individually on the terminal. The individual routing table will set up the originating terminal parameters to employ differing protocols and compression/decompression algorithms as dictated by the class of service. The terminating terminal will configure itself based on the class of service information set up by the originating terminal routing table and subsequently sent to the terminating terminal in the caller ID package forwarded to the terminating terminal during session setup. The CDMA BW request and class of service code sent by the originating terminal may be configured for various other uses. These may include return of streaming video from other types of terminations such as terminals used for surveillance. In this case, video and sound will be unidirectional from the terminating terminal to the originating terminal and broadband service will exist in the downlink while the uplink will be configured for voice bandwidth. These differing uses may be supported by the same routing table used for video exchange with options linked to the individual table entry.

Prior to full subscriber migration to the fourth generation network, the subscriber terminal may be configured to employ the existing second or third generation networks for voice and text messages. This will require dual frequency subscriber terminals to access 2G, 3G, and 4G networks.

Terminals may be configured to support the video option on various transmission facilities which may be integrated with the new fourth generation network. These will include mobile broadband wireless networks, "wireless city" networks (including "Hot spot" interfaces with 802.11) and "wireless city" networks interconnected with other "wireless city" networks by satellite link or fiber optic link. Interconnection of mobile and stationary wireless terminals into one network will allow voice and video communication between both fixed and mobile network entities.

The invention claimed is:

1. A portable, mobile, fourth generation cellular wireless video conferencing system comprising:

two terminals which comprises a calling terminal and a called terminal, each selected from a group comprising fourth generation cellular telephones and fourth generation cellular terminals;

comprising fourth generation cellular telephone and fourth generation cellular terminal equipped with a microphone and loudspeaker, a video display, a video camera and a subscriber routing table which is active in the calling terminal comprising a selection of a called terminal video subscriber table address which triggers the calling terminal;

to instruct a fourth generation network to set up a fourth generation communication channel with the bandwidth necessary to support streaming video and sound on a full duplex basis;

to provide a called terminal address to a fourth generation network for routing of the video call to a called terminal;

and to send video class of service code characters to the fourth generation network, the fourth generation network generates to the called terminal an individual video caller ID containing the video class of service which causes the called terminal to configure a called terminal to support streaming video and audio on a full duplex basis and enabling a ring tone unique to video conferencing, when, after a call connect, both the calling terminal and the called terminal are put into video mode and speaker phone mode automatically unless the called subscriber opts to not send video and selects a voice only keyed option comprising the called subscriber has the option of not sending video to the calling subscriber and which further comprises the called terminal receives video and voice from the calling terminal; the calling terminal receives from the called terminal voice and a video frame which informs that the called subscriber has opted to not send video when either sending or not sending video is selected manually as a called terminal option.

2. The fourth generation wireless video conferencing system of claim 1 comprising calling and called terminals which are used in a location selected from a group comprising buildings, automobiles, trains, airplanes, boats, ships and outdoor terrain.

3. A portable, mobile, fourth generation cellular wireless video conferencing method comprising:

two terminals which comprises a calling terminal and a called terminal, each selected from a group comprising fourth generation cellular telephones and fourth generation cellular terminals; comprising fourth generation cellular telephone and fourth generation cellular terminal equipped with a microphone and loudspeaker, a video display, a video camera and a subscriber routing table which is active in the calling terminal comprising a selection of a called terminal video subscriber table address which triggers the calling terminal;

to instruct a fourth generation network to set up a fourth generation communication channel with the bandwidth necessary to support streaming video and sound on a full duplex basis;

to provide a called terminal address to a fourth generation network for routing of the video call to a called terminal;

and to send video class of service code characters to the fourth generation network, the fourth generation network generates to the called terminal an individual video caller ID containing the video class of service which causes the called terminal to configure a called terminal to support streaming video and audio on a full duplex basis and enabling a ring tone unique to video conferencing, when, after a call connect, both the calling terminal and the called terminal are put into video mode and speaker phone mode automatically unless the called subscriber opts to not send video and selects a voice only keyed option comprising the called subscriber has the option of not sending video to the calling subscriber and which further comprises the called terminal receives video and voice from the calling terminal; the calling terminal receives from the called terminal voice and a video frame which informs that the called subscriber has opted to not send video when either sending or not sending video is selected manually as a called terminal option.

4. The fourth generation wireless video conferencing method of claim 3 comprising calling and called terminals which are used in a location selected from a group comprising buildings, automobiles, trains, airplanes, boats, ships and outdoor terrain.

* * * * *